United States Patent [19]

Penna et al.

[11] Patent Number: 5,784,064
[45] Date of Patent: Jul. 21, 1998

[54] IMAGE PROCESSING

[75] Inventors: David E. Penna, Redhill; Norman D. Richards, Horsham; Paul A. Winser, Redhill, all of England

[73] Assignee: U.S. Philips Corporation, New York, N.Y.

[21] Appl. No.: 795,295

[22] Filed: Feb. 4, 1997

Related U.S. Application Data

[63] Continuation of Ser. No. 275,903, Jul. 15, 1994, abandoned.

[30] Foreign Application Priority Data

Jul. 15, 1993 [GB] United Kingdom .................. 9314717

[51] Int. Cl.$^6$ .................................................. G00T 15/00
[52] U.S. Cl. ........................ 345/422; 345/422; 345/501; 358/448
[58] Field of Search ............................ 345/421-2, 428-9, 345/501-3, 189-90; 358/448; 395/122, 152, 162

[56] References Cited

U.S. PATENT DOCUMENTS

| | | | |
|---|---|---|---|
| 4,783,652 | 11/1988 | Lumelsky | 340/801 |
| 4,797,836 | 1/1989 | Witek et al. | 364/518 |
| 4,875,097 | 10/1989 | Jackson | 358/180 |
| 4,992,780 | 2/1991 | Penna et al. | 340/729 |
| 5,014,127 | 5/1991 | Richards | 358/133 |
| 5,077,608 | 12/1991 | Dubner | 358/183 |
| 5,270,812 | 12/1993 | Richards | 358/133 |
| 5,285,283 | 2/1994 | Fairhurst et al. | 348/705 |
| 5,295,234 | 3/1994 | Ishida et al. | 395/121 |
| 5,300,949 | 4/1994 | Rodriquez et al. | 345/202 |
| 5,339,386 | 8/1994 | Sodenberg et al. | 395/122 |
| 5,369,418 | 11/1994 | Richards | 345/185 |
| 5,408,272 | 4/1995 | Barnett et al. | 348/585 |
| 5,434,567 | 7/1995 | Mack et al. | 341/50 |
| 5,471,567 | 11/1995 | Snoderburg et al. | 395/133 |
| 5,493,637 | 2/1996 | Martin | 395/131 |

OTHER PUBLICATIONS

Iwamoto, Kazuyo et al, "Development of an Eye Movement Tracking Type Head Mounted Display: System Proposal and evaluation Experiments," *Robot and Human Communication, 1993 International Workshop*, pp. 287–291, (19930.

Perkins, Michael G., Data Compression of Steropairs, *IEEE Transactions on Communication*, pp. 684–696, (1992).

Foley, James D., et al, "Computer Graphics: Principles and Practices", Addison–Wesley Publishing Co., 2nd ed. Additional pages, pp. 169–170, 1990.

Gonzalez et al., "Digital Image Processing", pub. Addison Wesley: section relating to PDQ coding.

*Primary Examiner*—Phu K. Nguyen
*Assistant Examiner*—Rudolph J. Buchel
*Attorney, Agent, or Firm*—Robert M. McDermott

[57] ABSTRACT

Moving output images are presented to a two dimensional display, such as a conventional television receiver (26). Three video sources are read from a compact disc, a notional front image and a notional back image being in the form of CD-I A and B planes. A notional back plane is a full frame, full video rate image, read from the disc as a coded MPEG data stream. After decoding, each pixel of each image includes depth data and opacity data. It is thus possible for an image in the notional front or notional middle plane to pass behind an object in the notional back plane. The depth and opacity data is severely compressed for the MPEG stream, by a process of quantisation and run-length encoding. The low resolution depth values for each pixel are converted to high resolution depth values via a look up table in order to further define the depth of each notional plane.

18 Claims, 3 Drawing Sheets

IMAGE PROCESSING

This is a continuation of application Ser. No 08/275,903, filed Jul. 15, 1994. Now abandoned.

BACKGROUND OF THE INVENTION

The present invention relates to a method of image processing and image processing apparatus.

In particular, the present invention relates to a method of image processing in which moving output images are presented as a two dimensional display, in the form of time-separated two-dimensional frames of picture elements (pixels), wherein said output images are constructed from a first image and from a second image and, over a plurality of frames, said first image appears to move relative to a second image.

The construction of images from several components, which appear to move relative to one another, is known in the field of computer graphics; particularly when applied to computer games, etc. In such applications, not only does one component appear to move relative to the other but the movement is often under the interactive control of an operator. Thus, the system is often configured such that an operator has control of a component of a displayed image, by use of a suitable input device such as a joy-stick, tracker-ball, button pad or keyboard, etc.

While the interactive nature of such known computer systems is impressive, the quality of the images displayed tends to be somewhat artificial. A virtual threedimensional world-space may be simulated by a computer graphics system but the number of coordinate points which may be manipulated within this world-space in real-time is limited by the available processing facilities. Most computer graphics systems will manipulate a net of polygons for example and generate full colour images, on a frame-by-frame basis, by a process of rendering. Thus, it is difficult to specify the nature of each pixel in the three dimensional world space, and opportunities for achieving photo-realism are somewhat limited.

The manipulation of photo-realistic video images in real time is known in the art of video-graphics. In video-graphics, pixel values are manipulated so as to introduce distortions, modifications and special effects, while retaining the life-like quality of the original image. However, such effects are achieved by a significant amount of purpose built hardware, resulting in machines which are expensive and very task-specific. Furthermore, in known systems of this type, the video image is always sheet-like; it may be mapped onto a three dimensional object but it always remains in the form of a skin. Thus, video sequences may be created in which an object appears to be behind another object but this is only an illusion created by an artist. Thus, the machine provides an environment for an artist to work within but the artist's skill and judgement is still required to create the final result.

A problem which the present invention seeks to overcome is to provide an environment which moves towards combining the interactivity of computer graphics with the image quality of video graphics.

SUMMARY OF THE INVENTION

According to a first aspect of the present invention, there is provided a method of image processing of the aforesaid type which is characterized in that each of said first and second images has absolute depth values defined for substantially all of the pixels making up the respective images;

depth values of said first image are compared with depth values of the pixels of said second image to determine, on a pixel-by-pixel basis, whether pixels of the first image are in front of or behind pixels of said second image.

wherein said absolute depth values are processed at a higher resolution but stored at a lower resolution and lower resolution values are converted to higher resolution values by means of a look-up table; and preferential contributions are obtained from the front-most pixels of either the first image or the second image, in order to generate an output image in which said first image appears to move into or out from a display plane, so as to be in front of or behind elements of said second image, in response to their relative depth values.

The present invention also provides image processing apparatus, including means for presenting moving output images to a two-dimensional display, in the form of time separated two-dimensional frames of pixels, and means for constructing said output images from a first image and from a second image such that over a plurality of frames, said first image appears to move relative to said second image which is characterized by:

means for processing said data at a higher resolution so that said first image appears to move into or out from a display frame, so as to be in front of or behind elements of said second image, in response to depth values defined for said first image, with said first and second images having absolute depth values defined for substantially all of the pixels making up the respective images;

means for receiving depth values stored at a lower resolution and operable to convert them to said higher resolution by means of look up tables;

means for comparing depth values of said first image with the depth values of pixels of said second image to determine, on a pixel-by-pixel basis, whether pixels of said first image are in front of or behind pixels of said second image; and means for combining preferential contributions from the front-most pixels of either the first image or the second image in order to generate an output image.

Thus, an advantage of the present invention is that it provides an environment for three dimensional interactivity, while processing images on a pixel-by-pixel basis, so as to facilitate good picture quality.

In a preferred embodiment, the depth values are compressed, prior to being stored with the video information and de-compressed during playback. Compression may be effected by a process of quantisation and two-dimensional run length encoding, and compression may be in accordance with the MPEG standard.

BRIEF DESCRIPTION OF THE DRAWINGS

The invention will now be described by way of example only, with reference to the accompanying drawings, of which.

DETAILED DESCRIPTION OF THE PREFERRED EMBODIMENTS OF THE INVENTION

Figure 1:
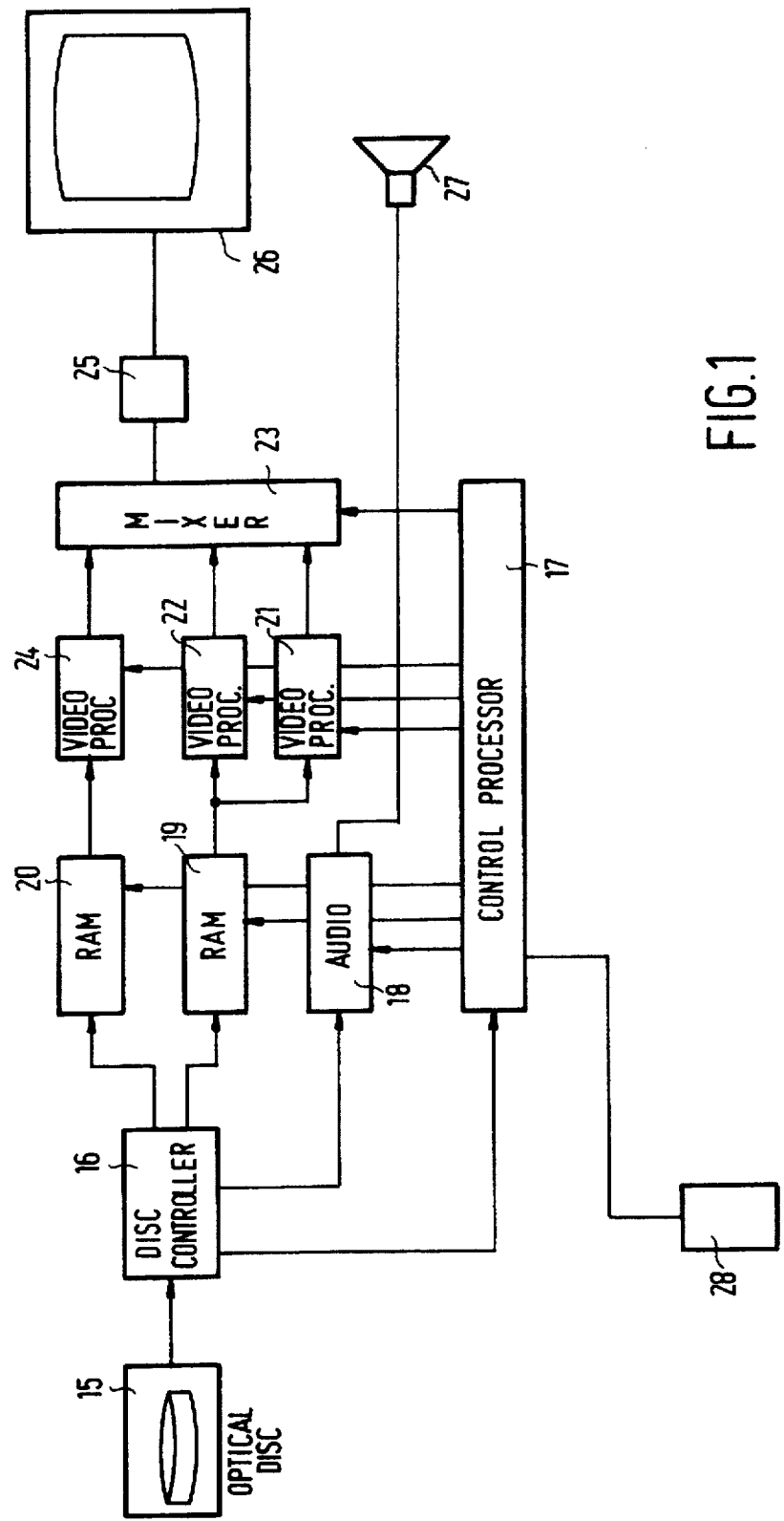
FIG. 1 shows a system for reading video sequences from an optical disc, including a processor for extracting depth information and a mixer for combining video sequences to produce a video output signal.

A system for reading video sequences from an optical compact disc is shown in FIG. 1. The system is arranged to combine three video planes, in which pixel values for each plane contain depth and opacity values, in addition to two-dimensional data and colour data.

Data, representing video images, audio signals and control programs, are stored on conventional optical compact discs. The data on said discs is read by a disc player 15 and supplied as a serial bit stream to a controller 16, at a rate of one hundred and fifty kilobytes per second.

The controller 16 is arranged to identify the nature of the data being supplied thereto and to direct said data to the appropriate processing circuitry. Thus, control programs are supplied to a control processor 17, audio signals are supplied to an audio processor 18 and video signals are supplied to a first random access memory device 19 or to a second random access memory device 20.

Memory devices 19 and 20 are arranged to receive video signals encoded under different standards. Thus, device 19 is arranged to receive substantially uncompressed video data, for the generation of small moving objects or still frames, while memory device 20 is arranged to receive video data compressed in accordance with the standard proposed by the ISO Moving Picture Experts Group (MPEG). As will be described hereinafter, if required, memory device 19 may also be arranged to receive compressed video data.

In accordance with systems sold under the Trade Mark "COMPACT DISC INTERACTIVE" (CD-I) memory device 19 receives data relating to two video planes, commonly referred to an "A" plane and a "B" plane. Each of these planes has a respective video processor 21 or 22, arranged to supply video signals V1 and V2 to a video mixer 23. Similarly, a video processor 24 receives MPEG encoded video data from random access memory device 20, decodes said data and again supplies a video signal V3 to the mixer 23.

The mixer 23 is arranged to combine the video signals, V1, V2 and V3, supplied thereto, to provide a digital video output signal to a digital to analog converter 25, which in turn supplies a conventional video signal to a video monitor or television set 26. Similarly, audio signals from the audio processor 18 are supplied to a loudspeaker 27, or combined with the output from the digital to analog converter 25, possibly modulated thereafter and supplied to a suitable input of a television set.

The operation of the system is dependent, primarily, on program instructions received from the compact disc player 15 and loaded to the control processor 17. Thus, initial information supplied from an optical disc would include programs for the control processor 17, which would then configure the system to suitably process further information, in the form of video and audio, from said player 15.

In addition, control of the system is also effected by an operator controlled interactive input, received from a hand controller 28.

The video images produced by video processors 21 and 22 represent foreground items, which may be considered as being similar to actors performing on a stage. Thus, in addition to moving within the two X and Y dimensions of the display plane, said objects are also configured to move and appear to move in the Z dimension, that is to say, in a direction perpendicular to the plane of the image.

The video image produced by the video processor 24 effectively represents a background, this being a full video frame capable of producing images at full video rate. In addition, the perceived movement of the foreground images is enhanced by them being seen to go behind elements of the background image, produced by processor 24, as their Z dimension increases, that is to say, as they move further away from the front plane of the displayed image.

Thus, rather than being a flat background plane, beyond which none of the foreground objects may pass, the background image produced by processor 24 may be considered as representing scenery, in which some portions of said scenery have a different Z dimension to other portions of said scenery.

Thus, over a plurality of frames, a first image produced by video processor 21, say, appears to move relatively to a second image, produced by video processor 24. Possibly in response to interactive commands supplied via the controller 28, the first image will appear to move further away from or nearer to the display plane, so as to be in front of or behind elements of the second image, in response to depth values defined by the first image. Furthermore, the second image also has depth values, defined for each pixel of said image. Thus, depth values of the first image are compared with depth values of the pixels of the second image to determine, on a pixel-by-pixel basis, whether the first image is in front of or behind the pixels of said second image. Thus, the mixer 23 is arranged to produce an output image generated predominantly from contributions from the front-most pixels of either the first image or the second image.

In addition to having a multi-bit depth value associated with each pixel, each pixel generated by the video processor 24 also has a multi-bit value identifying the opacity of that particular pixel. Thus, when fully opaque and when in the position of being the front-most pixel, a pixel will totally obscure any pixels found in lower planes. Similarly, when totally transparent, the pixel is not seen and image data is obtained from underlying pixels. Furthermore, being multi-bit, intermediate values may be given to the opacity values, resulting in a degree of blending between an upper and a lower pixel. Thus, in addition to facilitating transparency-effects such as fading between images, the inclusion of these opacity values at the edges of objects provides image blending. Thus, as objects from different planes overlap, they are given soft anti-aliased edges so as to achieve a natural looking result.

It is necessary for the mixer 23 to consider depth, opacity and colour for each pixel of the three input video planes, in order to produce an output signal which is supplied to the digital to analog converter 25. This is achieved by supplying depth values associated with each of the video signals to a depth resolving circuit. This depth resolving circuit produces a relative depth, or order, value for each pixel of the three planes and these depth values are in turn supplied to an opacity calculation circuit, for producing image factors for each of the three planes. Thus, blending on a pixel-by-pixel basis is performed with reference to the relative depth of the pixels and the pixel opacity.

Once image factors have been produced for each of the three planes, the video signals themselves are combined in a video combining circuit.

Figure 2:
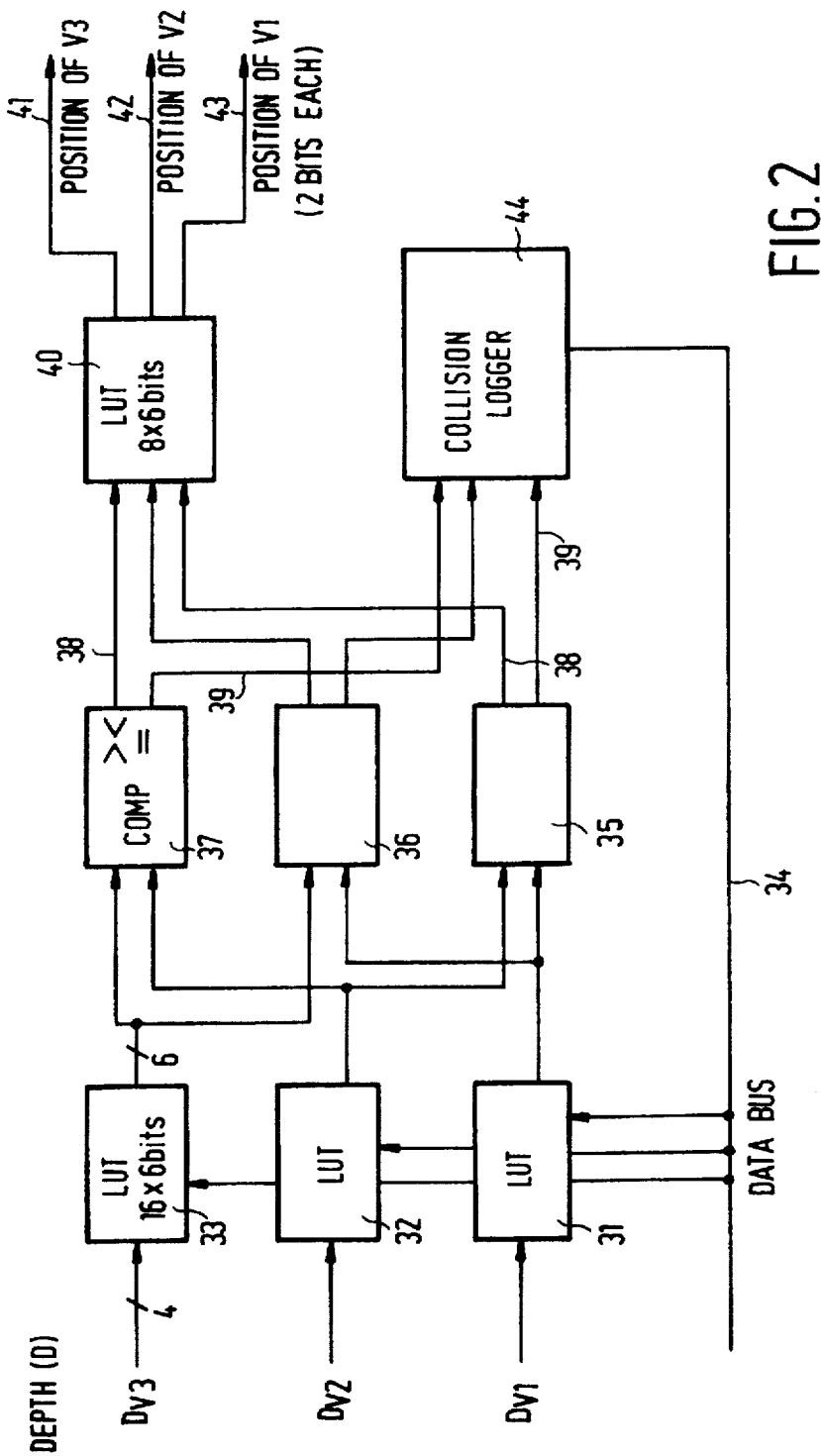
FIG. 2 details a depth order resolving circuit, forming part of the mixer shown in FIG. 1.

The depth resolving circuit, forming part of the mixer 23, is detailed in FIG. 2. For each of the three video signals V1, V2, V3 a four bit depth value is available for each pixel and said four bit values DV1, DV2, DV3 are supplied as inputs to respective look up tables 31, 32, 33.

Having four bit input values supplied thereto, each look-up table consists of sixteen addressable entries and each of said addressable entries comprises a total of six bits. The look up tables are programmable, via a data-bus 34, therefore the conversion of the four bit input values to six bit values may be changed, on a frame-by-frame basis if so desired. Thus, the depth resolution produced by the system is significantly greater than that provided by the initial four bits generated on a pixel-by-pixel basis.

Each six bit value is supplied to each of three comparators 35, 36, 37, each of which may produce an output signal on a line 38, indicating that one of the inputs supplied thereto is in front of one of the other inputs supplied thereto or, alternatively, they may produce an output on a line 39, indicating that the levels are equal.

The output signals on line 38 are supplied to a look up table 40 which, from said three input values, produces depth ordering values, each of two bits. Thus, a first output line 41 identifies the relative position of video plane V3, that is to say, a two bit value is generated identifying this plane as being at the front, in the middle or at the back. Similarly, on line 42 a two bit value is generated to identify the position of video plane V2 and a similar two bit value is generated on line 43 to identify the position of video plan V1. Thus, after the 6 bit values have been processed by comparators 35, 36 and 37, an ordering is produced on a pixel-by-pixel basis for each of the video planes. Thus, whereas the outputs from look up tables 31, 32 and 33 represent actual positions in the Z direction, the outputs from look up table 40 merely represent an ordering preference, that is to say, the two-bit values identify obscuration priorities for the three video planes.

The outputs from line 39 may be used to indicate that a collision has occurred, particularly useful in video games etc., and the existence of such a collision is logged in a collision logging circuit 44, which in turn supplies data back to the control processor 17 via the data-bus 34. The circuit shown in FIG. 2 automatically tracks the movement of objects in the depth direction. Thus this function does not have to be provided by an application program. Similarly, the provision of circuit 44 identifies data to the application program to the effect that a collision has occurred, again, removing another burden from the requirements of the application program.

Figure 3:
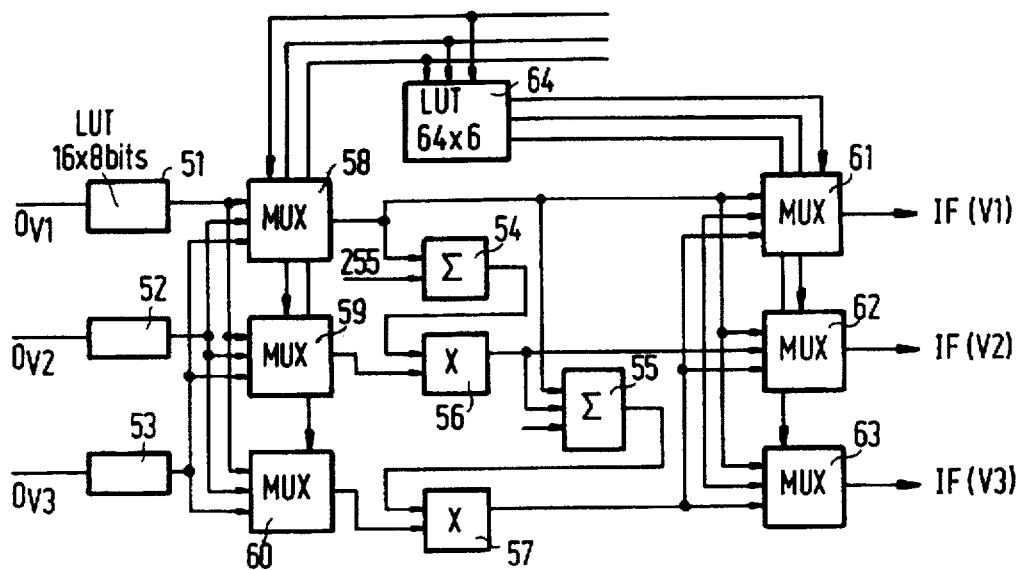
FIG. 3 details an opacity calculation circuit, forming part of the mixer shown in FIG. 1; and, FIG. 4 details a video combining circuit, forming part of the mixer shown in FIG. 1.

An opacity calculation circuit is shown in FIG. 3, in which four bit opacity values OV1, OV2, OV3 for each of the three video planes are supplied to respective look up tables 51, 52, 53. In order to produce smooth blending at the edges of intersections, the look up tables 51, 52, 53 are each eight bits deep and the actual way in which the four bit input values are converted into eight bit output values may be controlled on a frame by frame basis, in response to data supplied from the control processor 17.

Thus, it will be appreciated that the number of bits provided for both the depth values and the opacity values are expanded by means of look up tables. The expansion of depth values allows for more than sixteen object depths to be provided. Furthermore, it also allows the depth of an object to be changed by changing its depth look up table, without changing the actual coded data for the object. The expansion of opacity values to eight bits, from an initial four bits, allows soft fading to be provided between images. Thus, in order to provide smooth edges having a plurality of opacity values, look up table values may be changed on a frame-by-frame basis, possibly giving a first position on the first frame and an intermediate position on a second frame, from the same input data, in order to provide the soft edge.

A summation circuit 54, a summation circuit 55, a multiplier 56 and a second multiplier 57 are configured in such a way as to receive pixel values from the first, second and third planes, re-ordered as front, middle and back, as defined by the two-bit position codes from table 40. The re-ordering of these planes is achieved by means of multiplexers 58, 59, 60, each arranged to receive the three outputs from the look up tables 51, 52, 53 and to select an output in response to said two bit values. Thus, the output from each multiplexer may be equivalent to any one of the outputs from the three look up tables 51, 52 and 53. Similarly, multiplexers 61, 62 and 63 receive the ordering information, suitably modified by a look up table 64.

The output from multiplexer 61 consists of an image factor IF(V1) for the first video image, similarly, the output from multiplexer 62 consists of an image factor IF(V2) for the second video image and the output from a multiplexer 63 consists of an image factor IF(V3) for the third video image. Thus, the image factor data takes account of pixel position in the Z dimension and also takes account of pixel opacity. In this way, the video images may be combined by simple addition, their position and opacity values being taken into account by their respective image factors.

An image factor for the front video image, which may be any one of the three video images available, is generated by the multiplexer 58 and supplied to each of the multiplexers 61, 62 and 63. Summation circuit 54 receives a fixed value of 255 at its positive input and receives the output from multiplexer 58 at its negative input. Thus, the output from summation circuit 54 consists of the front image factor subtracted from 255, which is in turn supplied to multiplier 56. The middle image factor is generated as the output from multiplier 56, which receives the output from multiplexer 59 at its second input.

The output from multiplexer 58 is also supplied to a negative input of summation circuit 55, which also receives the output from multiplier 56 at a negative input. Thus, these two inputs are subtracted from a fixed value of 255, which is in turn supplied to an input of a multiplier 57. Multiplier 57 receives at its second input the output from multiplexer 60, to generate the back image factor for each of the three output multiplexers 61, 62 and 63.

Thus, the first video image is notionally the front video image, the second video image is notionally the middle video image and the third video image is notionally the back video image. However, in response to the depth order information received from the depth resolving circuit, these orders may be adjusted on a pixel-by-pixel basis. The circuit shown in FIG. 3 takes account of this information and, in addition, introduces blending information to produce image factor information for each of the three video signals. Thus, the image factor information generated by the circuit shown in FIG. 3 is supplied to a video combining circuit, in addition to the actual video information for each of the planes.

Figure 4:
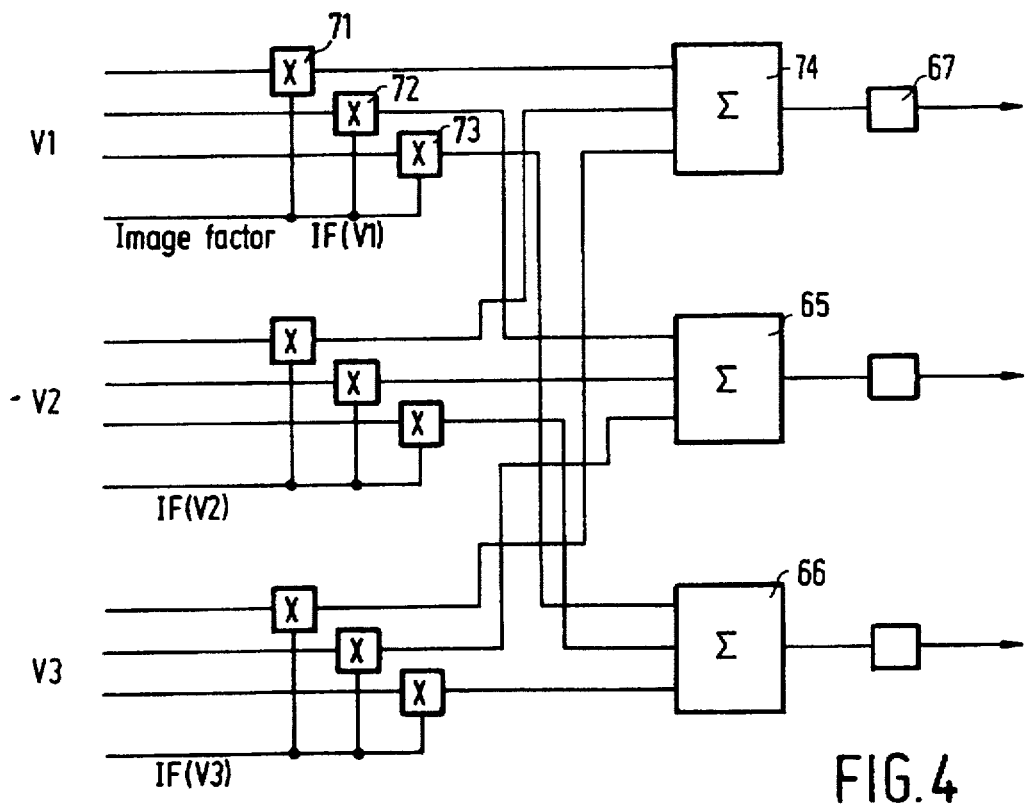

A video combining circuit, forming part of the mixer 23, is shown in FIG. 4. It is assumed that each video signal consists of eight bits allocated to each of the red, green and blue colour components, although matrix circuitry may have been included to convert alternatively coded video information, such as luminance plus colour difference values, into suitably encoded additive red, green and blue signals.

Each video signal V1, V2, V3 is supplied to a collection of three multipliers 71, 72, 73, each arranged to multiply one of the colour components by the respective image factor. All of the processed red components are then combined in a red summation circuit 74, with all the processed green components combined in a similar summation circuit 65 and the processed blue components combined in a similar summation circuit 66. The output from each summation circuit 74, 65, 66 provides one of the colour signals, via a suitable limiting circuit 67.

Referring to FIG. 2 and FIG. 3, it is noted that the depth information and the opacity information both consist of four bits for each pixel location, thereby increasing the amount of data required for each pixel by a further eight bits.

In an environment of the type shown in FIG. 1, in which all of the video information is derived from a conventional computer-based storage device 15, such as a compact optical disc, it is not possible to obtain a further eight bits per pixel at full video rate. Thus, in the present embodiment, in order to obtain the required information, the data is compressed prior to being stored and, subsequently, de-compressed by the video processing circuits 21, 22, 24.

To facilitate an understanding of the de-compression process, the procedure will be described with reference to compression, it being understood that the reverse process is performed by the video processor.

A depth value is identified for each pixel of the frame. At this stage, the depth values are effectively defined to a resolution of six bits and a quantisation matrix is selected for the image frame. Thus, based on the six bit values selected, a best match is identified for converting these six bit values to four bit values, from the available quantisation matrices.

The six bit values are quantised to four bits, using the selected quantisation matrix and data identifying the selected matrix is stored, allowing it to be used for the programming of look up tables 31, 32 and 33 of FIG. 2.

After the depth values have been quantised, to four bits per pixel location, further compression is effected by a process of two dimensional run-length encoding. The procedure used is similar to that identified as PDQ coding, described by Rafael C. Gonzales and Paul Vince in their book "Digital Image Processing", published by Addison Wesley.

Edges of objects within the frame are effectively tracked. Two consecutive lines of data are considered, in which the first line has been coded, with a view to coding the second line. Positions at which transitions occur are recorded for the first line and on considering the second line, the positions of transitions in the second line are considered and an attempt is made, effectively, to match up the transitions of the second line with similar transitions of the first line. This results in a list of changes which, given data derived from the first line, will allow the new line to be specified.

Three types of change are possible. The first, and by far the most common, is a specification to the effect that an edge exists with the same value as the previous line. In this case, an output code is generated to the effect that the same edge is present but at a specified horizontal offset from the corresponding edge of the previous line. For this type of change, a very common example is to the effect that the edge has actually stayed in the same position.

The second type consists of data to the effect that there is no edge in the second line which corresponds to the edge in the first line, therefore requiring data to the effect that the edge is to be ignored. Thirdly, it is possible that a new edge has become present, which did not exist in the previous line and, again, data is required to the effect that a new edge is present.

Some of the edge specifications are very much more common than others, therefore this inherent redundancy facilitates the use of Hufdfman coding, thereby providing further compression. Thus, for example, the situation in which an edge is repeated in the next position may be coded as a single bit, thereby achieving a maximum degree of compression.

It will be appreciated that, at some stage, it is necessary to generate data relating to the depth of objects. In order to facilitate this procedure, it is possible to take advantage of chroma-keying techniques, to provide depth specifications. Commonly, in chromakeying techniques, a blue pixel is processed as if it were completely transparent, allowing other objects in the frame to be placed against a new background. In the present embodiment, the transparent colour could be processed in such a way as to treat the pixel as being placed at the furthest distance in the Z direction, effectively placing it behind all other objects.

As previously stated, it is necessary to have eight bit opacity values, particularly at transition edges, so as to provide soft anti-aliased blending between the edges. As an alternative to storing actual values for opacity on a pixel-by-pixel basis, it would be possible to provide values identifying the position of edges in the X dimension, that is to say, along a line, to a definition greater than that of the actual pixel spacing. With this degree of resolution it would then be possible to calculate opacity values for the pixels at which transitions occur, from which suitable image factors may be derived.

From the foregoing description it will be readily apparent that the invention also encompasses an image storage and encoding method which comprises storing pixel values with associated depth values and to a storage medium, such as an optical disc, containing picture information in the form of pixel values and associated depth values.

From reading the present disclosure, other modifications will be apparent to persons skilled in the art. Such modifications may involve other features which are already known in the design, manufacture and use of image processing apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of image processing, in which moving output images are presented as a two-dimensional display in the form of time-separated two-dimensional frames of pixels in a display plane, wherein, over a plurality of frames, components of a first planar image appear to move relative to components of a second planar image, said method comprising the steps of constructing said output images form said first planar image and from said second planar image, each of said first and second planar images comprising pixels, and substantially all of the pixels of the first and second planar images having a respective absolute depth value defined therefor;

comparing absolute depth values of the pixels of said first planar image with absolute depth values of the pixels of said second planar image to determine, on a pixel-by-pixel basis, whether pixels of the first planar image have a greater or lesser absolute depth than corresponding pixels of said second planar image; and obtaining preferential contributions from the pixels having the lesser absolute depth of any of the first planar image and the second planar image in order to generate a planar output image in which components of said first planar image move relative to components of said second planar image in said display plane coincident with said first and second image planes, so as to appear to be in front of or behind elements of said second planar image, based on their relative depth values;

wherein at least one of the comparing and obtaining steps includes converting said absolute depth values from a lower resolution, at which they are stored, to a higher resolution by means of a look-up table, and processing those absolute depth values at that higher resolution.

2. A method according to claim 1, wherein said look-up table is reprogrammable for each image frame.

3. A method according to claim 1, wherein depth values are stored as an array of values compressed by a process of two-dimensional run length encoding and combined with temporally and spatially compressed video data.

4. A method according to claim 3, wherein said video data is compressed in accordance with an MPEG standard compression algorithm.

5. A method according to claim 3, wherein opacity values are supplied for each pixel of said first and second planar images, and processed with said depth values to calculate an image factor for each pixel of each planar image.

6. A method according to claim 1, including a third video image comprising pixels and having absolute depth values defined for substantially all of the pixels comprised in the third video image, wherein depth values are considered on a pixel-by-pixel basis for each corresponding pixel location for each of said three images.

7. A method according to claim 5, wherein said video data, depth data and opacity data are stored on a compact optical disc and read from said disc in accordance with conventional data access procedures, and said video images interact in response to program data read from said disc and in response to interactive commands from an operator.

8. Image processing apparatus, including means for presenting moving output images to a two-dimensional display, having a display plane, in the form of time-separated two-dimensional frames of pixels, and means for constructing said output images from a first planar image and from a second planar image such that over a plurality of frames, elements of said first planar image appear to move relative to elements of said second planar image, characterized by:

means for processing said data at a higher resolution so that elements of said first planar image moving relative to elements of said second planar image in said display plane appear to be in front of or behind said elements of said second planar image, in response to depth values defined for said first planar image, with said first and second planar images having absolute depth values defined for substantially all of the pixels making up the respective images;

means for receiving depth values stored at a lower resolution and operable to convert them to said higher resolution by means of look-up tables;

means for comparing depth values of said first planar image with depth values of pixels of said second planar image to determine, on a pixel-by-pixel basis, whether pixels of said first planar image having a lesser or greater depth value than pixels of said second planar image; and means for combining preferential contributions from those pixels of either the first planar image or the second planar image having the lesser depth value in order to generate an output image.

9. Apparatus according to claim 8, including means for re-programming said look up tables on a frame-by-frame basis.

10. Apparatus according to claim 8, including means for decompressing two-dimensional run-length encoded data defining said depth values, and means for separating said run-length encoded depth data from temporally and spatially compressed video data.

11. Apparatus according to claim 10, including means for de-compressing video data compressed in accordance with the MPEG recommendation.

12. Apparatus according to claim 8, including means for supplying opacity values for each pixel of the video planar images, and processing means for processing said opacity values to calculate image factors for each pixel of each input planar image.

13. Apparatus according to claim 12, including means for de-compressing and decoding opacity values, coded by quantisation and two-dimensional run-length encoding, and read from a storage device.

14. Apparatus according to claim 12, wherein said opacity values are generated from data defining the position of edge transitions at a definition greater than the pixel spacing.

15. Apparatus according to claim 8, including means for generating a third video image made up of pixels and having absolute depth values defined for substantially all of said pixels, wherein depth values are considered on a pixel-by-pixel basis for each pixel location for each of said three images.

16. Apparatus according to claim 15, wherein video data, depth data and opacity data are stored on a compact optical disc and are read from said disc in accordance with standard data access procedures for a medium, and further including means for controlling the interaction of video images, in response to program data read from said disc and in response to interactive commands from an operator.

17. A method of displaying moving output images to a two-dimensional display comprising:

forming a first planar image having a plurality of two-dimensional time separated frames of pixels, substantially each pixel having a low resolution depth value;

forming a second planar image having a plurality of two-dimensional time separated frames of pixels, substantially each pixel having a low resolution depth value;

converting the low resolution depth values of the pixels of the frames of the first and second planar images to higher resolution depth values by means of a look up table;

displaying an output image by combining the first and second planar images and comparing the higher resolution depth values of the pixels of the frames of the first and second planar images on a pixel-by-pixel basis and obtaining preferential contributions from the front-most pixels of the first and second planar images based on the results of the comparison so that components of the first planar image moving relative to components of the second planar image cross a display plane appear to be in front of or behind components of said planar image.

18. An image processing apparatus for presenting moving output images to a two-dimensional display comprising:

means for forming a first planar image, said first planar image having a plurality of two-dimensional time separated frames of pixels, substantially each pixel having a low resolution depth value;

means for forming a second planar image, said second planar image having a plurality of two-dimensional time separated frames of pixels, substantially each pixel having a low resolution depth value;

at least one look up table for converting the low resolution depth values of the pixels of the frames of the first and second planar images to higher resolution depth values;

means for combining the first and second planar images and comparing the higher resolution depth values of the pixels of the frames of the first and second planar images on a pixel-by-pixel basis and for obtaining preferential contributions from the front-most pixels of the first and second planar images based on the results of the comparison so that components of the first planar image moving relative to components of the second planar image across a display plane appear to be in front of or behind components of second planar image.

* * * * *